(12) United States Patent
Lin et al.

(10) Patent No.: US 8,559,810 B2
(45) Date of Patent: Oct. 15, 2013

(54) EXTENDABLE EMITTER MODULE AND ELECTRONIC APPARATUS

(75) Inventors: Wei-Pong Lin, Taipei (TW);
Ting-Cheng Lin, Taipei (TW)

(73) Assignee: Ability Enterprise Co., Ltd., Taipei (TW)

( * ) Notice: Subject to any disclaimer, the term of this patent is extended or adjusted under 35 U.S.C. 154(b) by 60 days.

(21) Appl. No.: 13/273,466

(22) Filed: Oct. 14, 2011

(65) Prior Publication Data

US 2012/0224351 A1    Sep. 6, 2012

(30) Foreign Application Priority Data

Mar. 4, 2011   (TW) .............................. 100107365 A

(51) Int. Cl.
*G03B 15/05* (2006.01)
*G03B 15/02* (2006.01)

(52) U.S. Cl.
USPC .......................................... 396/173; 396/171

(58) Field of Classification Search
CPC ...................................................... G03B 15/02
USPC ................................... 362/3, 5; 396/173, 177
See application file for complete search history.

(56) References Cited

U.S. PATENT DOCUMENTS

| | | | | |
|---|---|---|---|---|
| 4,357,087 A * | 11/1982 | Ikawa et al. | ................... | 396/177 |
| 6,351,609 B1 * | 2/2002 | Hosokawa et al. | ........... | 396/177 |
| 6,713,700 B2 * | 3/2004 | Hsu | ............................... | 200/344 |
| 7,519,288 B2 * | 4/2009 | Kim | ............................. | 396/177 |
| 2011/0188848 A1 * | 8/2011 | Sotsu | ........................... | 396/542 |
| 2013/0028585 A1 * | 1/2013 | Lee | .............................. | 396/165 |

OTHER PUBLICATIONS

John Barton et Al, "Distributed, Embedded Sensor and Actuator platforms"; Springer 2008.*

* cited by examiner

*Primary Examiner* — Clayton E Laballe
*Assistant Examiner* — Kevin Butler
(74) *Attorney, Agent, or Firm* — Rabin & Berdo, P.C.

(57) ABSTRACT

Embodiments of this invention provide a flash module and an electronic apparatus using the flash module. The electronic apparatus has a sensor and a processor. The sensor is used by the processor to detect an environmental brightness and issue a flash order. The flash module comprises a flash cartridge, a linkage lever set, a housing, an electromagnetic actuator, a mechanical linkage, and a latching mechanism. When necessary, the elements of the flash module perform a process to automatically move the flash to an open position.

20 Claims, 14 Drawing Sheets

EXTENDABLE EMITTER MODULE AND ELECTRONIC APPARATUS

CROSS-REFERENCE TO RELATED APPLICATIONS

The entire contents of Taiwan Patent Application No. 100107365, filed on Mar. 4, 2011, from which this application claims priority, are incorporated herein by reference.

BACKGROUND OF THE INVENTION

1. Field of the Invention

The present invention relates to emitter modules, especially light-emitting modules, and electronic apparatuses having the emitter modules.

2. Description of Related Art

In photography, a flash is a device used for producing an artificial light to illuminate a scene. The flash is, for example, to take an exposure of a dark environment such as night or when needed to simulate a real light scene. In addition, the flash may be used for capturing quickly moving objects or changing the quality of light.

Modern cameras often activate the flash automatically. The flash and the camera are synchronized by using a flash synchronization cable, a radio signal, or a light-triggered device.

A built-in type of pop-up electronic flash includes a light emitter embedded in an accommodation compartment of a camera. If necessary, the light emitter moves from the accommodation compartment to a light emitting position. When the user presses the shutter button, the light emitter flashes synchronously.

To satisfy the current compact-size trend, a good built-in type of pop-up flash requires fewer elements to open and shut itself in a limited space.

SUMMARY OF THE INVENTION

An object of the present invention is to provide built-in type of pop-up flash module employing fewer elements to open and shut itself in a limited space. Another object of this invention is to provide an image-capturing apparatus using the compact flash module.

Accordingly, one embodiment of this invention provides an emitter extension and retraction module comprising an extendable and retractable cartridge, a linkage lever set, a housing, a driver or actuator, a mechanical linkage, and a retractable latch. The cartridge has a notch for receiving the latch in a cartridge-retaining position. The cartridge also has a lower thrust abutment for forcing the mechanical linkage into a default, cartridge-retracting position. The linkage lever set is used for moving the cartridge between respective open and closed positions. The housing comprises an accommodation space. When the cartridge is in the closed position, the cartridge is retracted in the accommodation space. The driver comprises a moving part. When the cartridge is in the closed position, the driver attracts the moving part into a first position, relative to the driver of which it is a part, that operates to retain the moving part into the first position.

Another embodiment of this invention provides an image-capturing apparatus comprising the foregoing emitter module.

Yet another embodiment of this invention provides an electronic apparatus comprising a sensor, a processor, and a flash module. The sensor is used for detecting an environmental brightness. The processor is used for issuing a flash order according to the environment brightness. The flash module comprises a flash cartridge, a linkage lever set, a housing, an electromagnetic actuator, a mechanical linkage (like that described above), a latching mechanism (also like that describe above), a first elastic member, and a second elastic member. The first elastic member is arranged between the housing and the mechanical linkage. The second elastic member is arranged between the housing and the latching mechanism.

The built-in type emitter or flash modules of embodiments of this invention employ a few elements to open and close the flash. This is beneficial to reduce the size of the image-capturing apparatus.

BRIEF DESCRIPTION OF THE DRAWINGS

FIG. 1A and FIG. 1B show a flash module 1 according to a preferred embodiment of this invention, wherein FIG. 1A shows the flash module 1 in a closed position, and FIG. 1B shows the flash module 1 in an open position.

FIG. 9A and FIG. 9B are partial views of the flash module 1 according to the preferred embodiment of this invention, in which FIG. 9A shows the closed flash cartridge 10, and FIG. 9B shows the opened flash cartridge 10.

DESCRIPTION OF THE PREFERRED EMBODIMENT

Reference will now be made in detail to specific embodiments of the invention. Examples of these embodiments are illustrated in accompanying drawings. While the invention will be described in conjunction with these specific embodiments, it will be understood that it is not intended to limit the invention to these embodiments. On the contrary, it is intended to cover alternatives, modifications, and equivalents may be included within the spirit and scope of the invention as defined by the appended claims. In the following description, numerous specific details are set forth in order to provide a thorough understanding of the present invention. The present invention may be practiced without some or all of these specific details. In other instances, well-known components and process operations are not been described in detail in order not to unnecessarily obscure the present invention. While drawings are illustrated in details, it is appreciated that the quantity of the disclosed components may be greater or less than that disclosed, except expressly restricting the amount of the components.

Figure 1A:
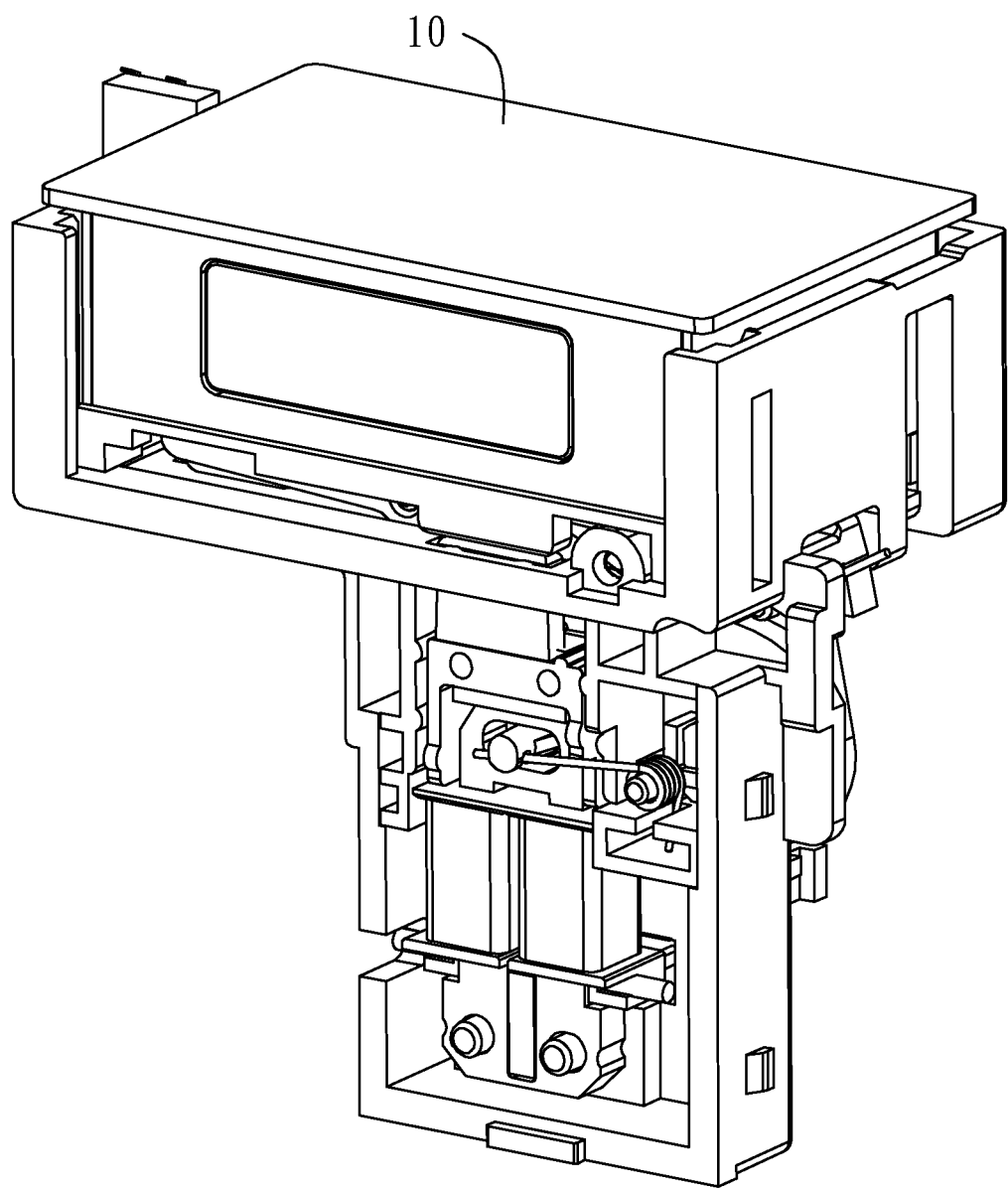
Figure 1B:
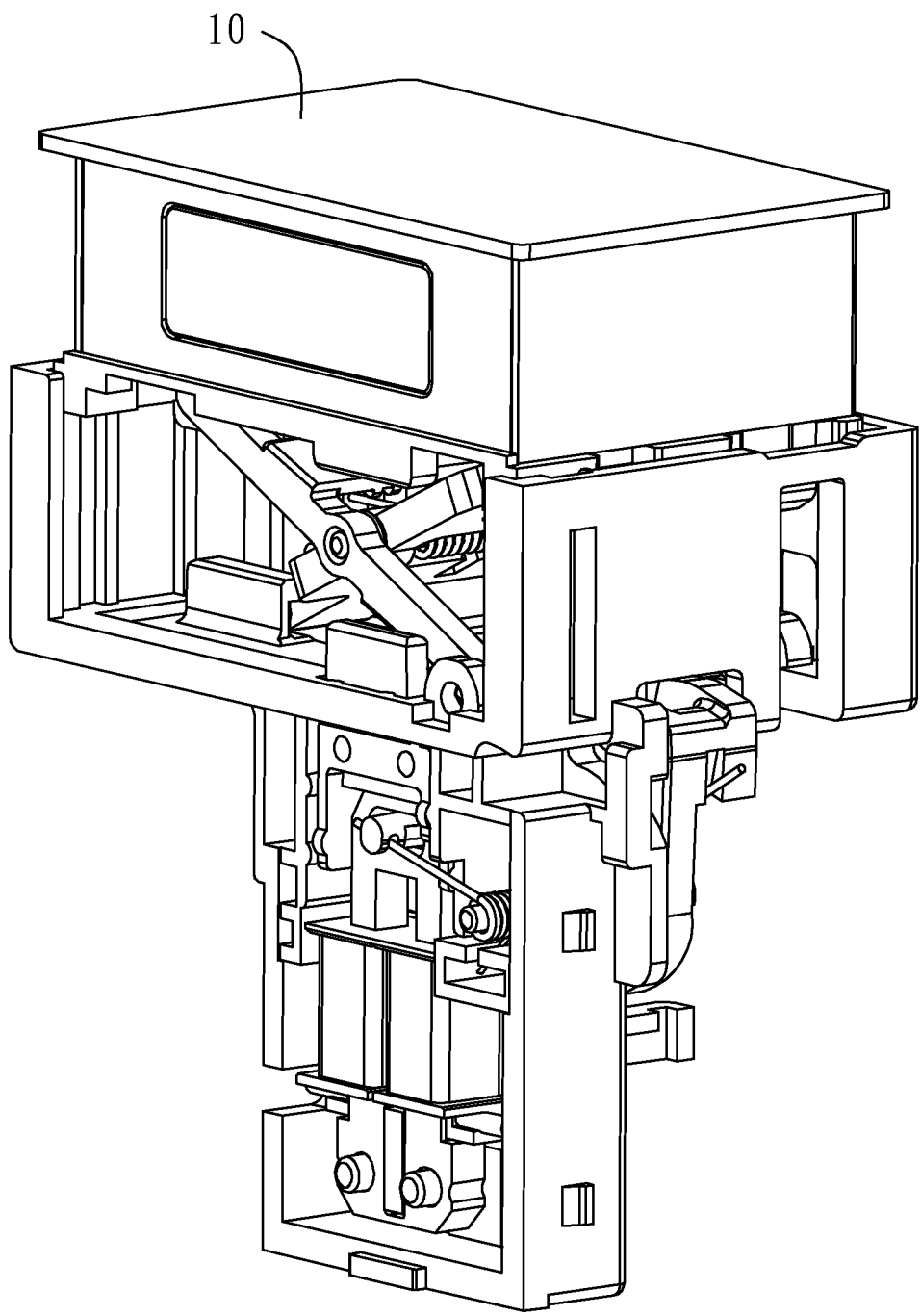

FIG. 1A and FIG. 1B show a flash module 1 according to a preferred embodiment of this invention, wherein FIG. 1A shows the flash module 1 in a closed position, and FIG. 1B shows the flash module 1 in an open position. The flash module 1 of the embodiment may be applied in an image-capturing device, such as camera or video camera. The flash module 1 comprises a flash cartridge or receptacle 10 having a cartridge body carried on a shaft. The flash cartridge 10 is popped up from the retracted position to the extended position, as respectively shown in FIG. 1A and FIG. 1B. When the user presses a shutter button, the flash flashes synchronously.

The above-mentioned flash module employs some linked elements to extend and retract the flash cartridge 10. The following describes the details.

Figure 2:
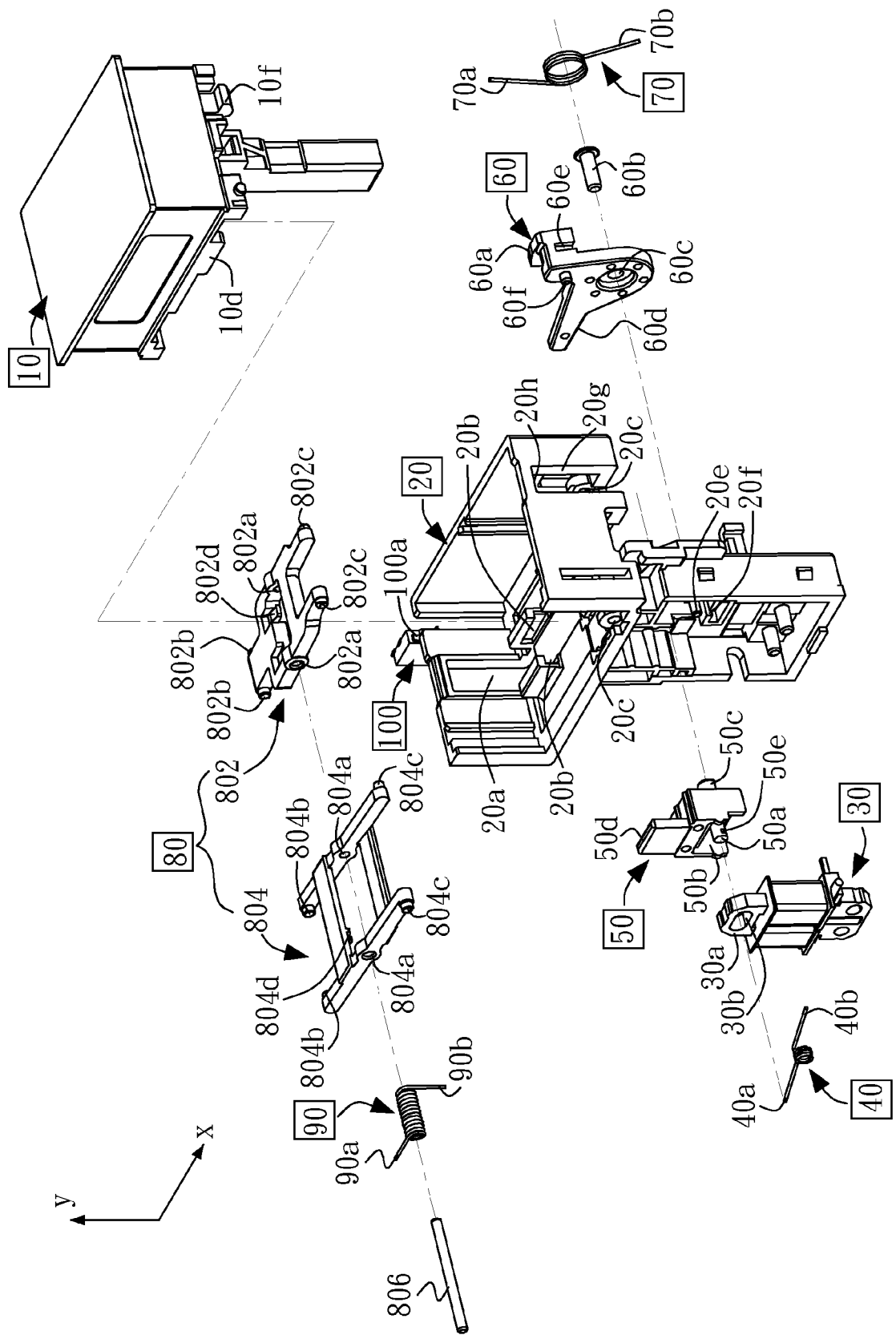
FIG. 2 is an explosion drawing of the flash module 1 according to the preferred embodiment of this invention.

FIG. 2 is an exploded view drawing of the flash module 1, which primarily comprises the flash cartridge 10, a housing 20, an electromagnetic actuator 30, a first torsion spring 40, a mechanical linkage 50, a latching mechanism 60, a second torsion spring 70, a scissor lift assembly or double-lever linkage lever set 80, a third torsion spring 90, and a switch 100.

The flash cartridge includes a light emitter such as a flash bulb. In addition, the body of the flash cartridge 10 comprises two gudgeons or pivot post receptacles 10a for mounting one section of the scissor lift assembly, two tracks 10b for mounting a second section of the scissor lift assembly, a retention notch 10c for receiving a latch to retain the flash cartridge 10 in a retracted position, a thrust abutment 10d for urging the flash cartridge into an extended position, a control rod 10e for detecting the cartridge position, and at least a stop 10f to prevent the flash cartridge 10 from extending too far (as further illustrated in FIGS. 4, 7, 9A, 9B, 10, 11A, and 11B).

To extend the flash cartridge 10, the scissor lift assembly 80 is placed in an accommodation space or recess 20a of the housing 20, between the flash cartridge 10 and the housing 20. When the scissor lift assembly 80 is fully retracted within the accommodation space 20a, the flash cartridge 10 is in a retracted and closed position. When the scissor lift assembly 80 extends upwardly from the accommodation space 20a, the flash cartridge 10 is in an extended and opened position.

Figure 3:
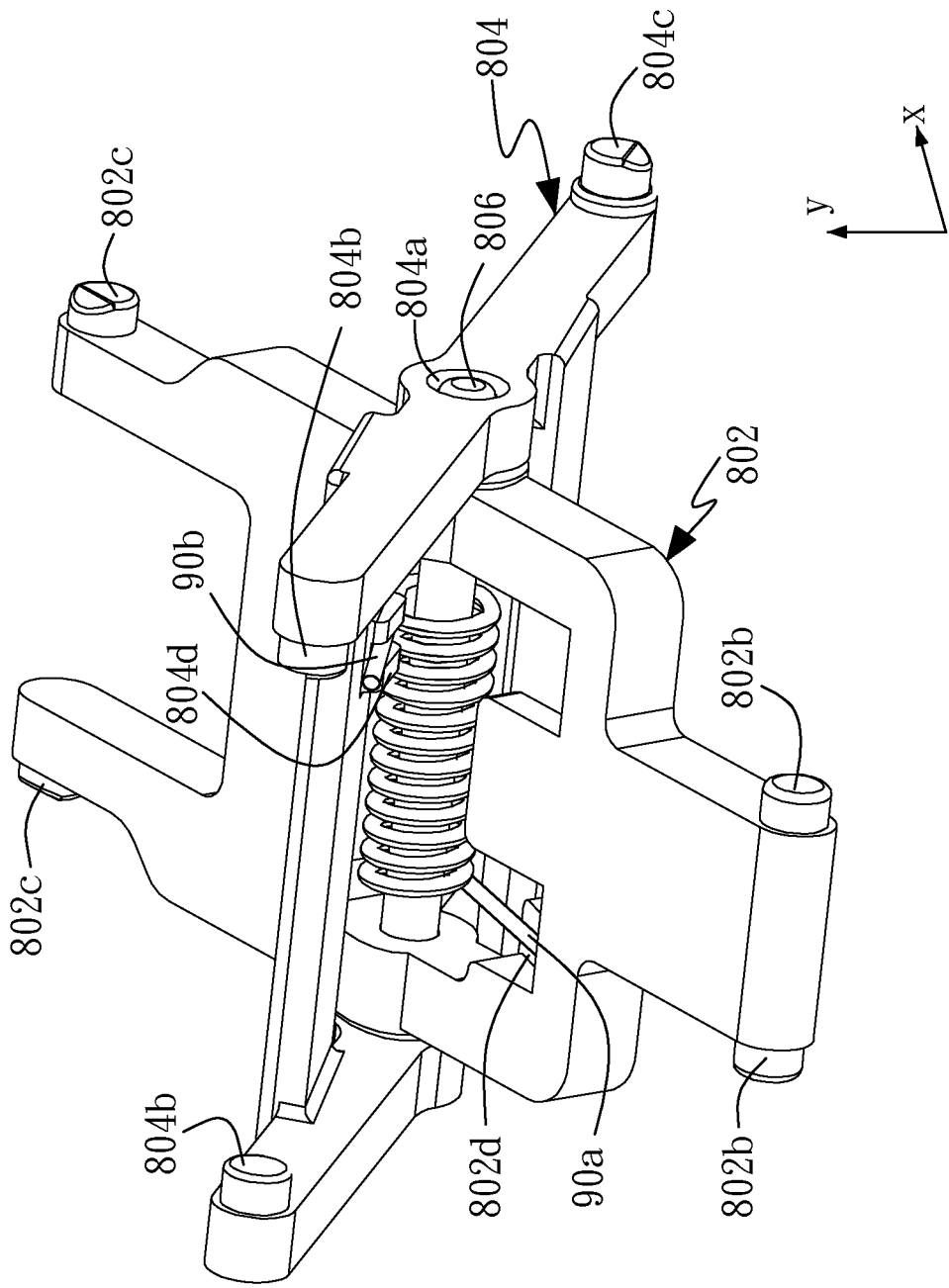
FIG. 3 is a perspective view of the linkage lever set 80 according to the preferred embodiment of this invention.
Figure 4:
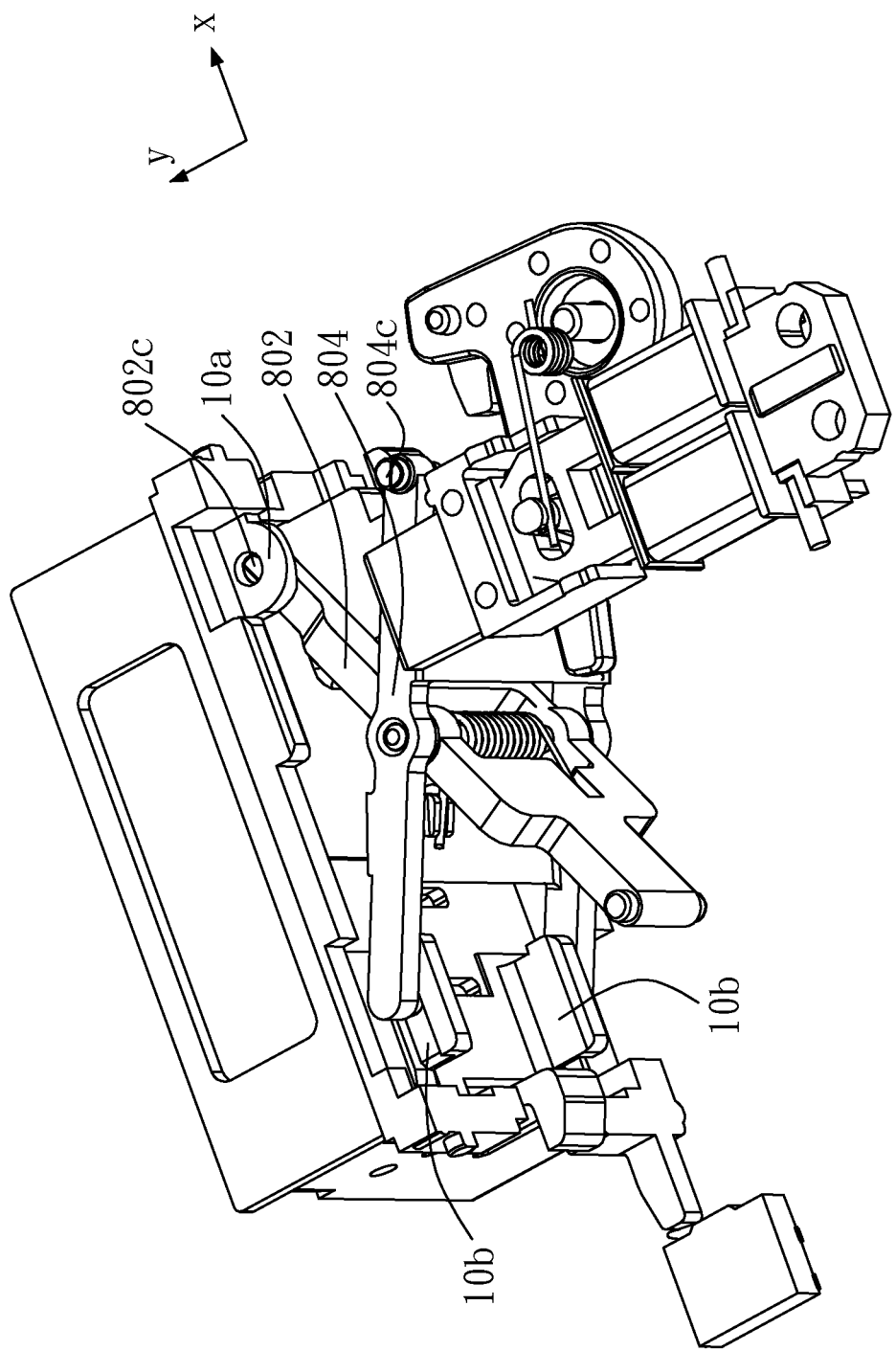
FIG. 4 is a perspective view of the opened flash cartridge 10 at a specific view angle according to the preferred embodiment of this invention.

FIG. 3 is a perspective view of the scissor lift assembly 80. FIG. 4 is a perspective view of the extended flash cartridge 10 at a specific view angle, in which the housing 20 is omitted for clarity. Referring to FIG. 2, FIG. 3, and FIG. 4, the scissor lift assembly 80 is constructed by a first linkage lever 802, a second linkage lever 804, and a first hinge or fulcrum 806 about which the levers 802 and 804 synchronously and oppositely pivot. The first linkage lever 802 comprises two symmetrical, coaxial pivot holes 802a, two symmetrical, coaxial outward guide studs or protrusions 802b, two pivot posts or pintles 802c, and a recess 802d. The second linkage lever 804 comprises two symmetrical, coaxial pivot holes 804a, two symmetrical inward, coaxial guide studs or protrusions 804b, two pivot posts or pintles 804c, and a recess 804d. The first hinge or fulcrum 806 passes through the holes 804a of the second linkage lever 804, the third torsion spring 90, and the holes 802a of the first linkage lever 802, so as to construct X-shaped, scissor lift linkage lever set 80. The two pintles 802c of the first linkage lever 802 are respectively inserted into the two gudgeons 10a of the flash cartridge 10, and the two guide studs 802b are respectively arranged in two corresponding tracks 20b of the housing 20 so as to slide the protrusions 802b within the tracks 20b. The two pintles 804c of the second linkage lever 804 are respectively inserted into two gudgeons or pivot post receptacles or sockets 20c of the housing 20, and the two guide studs 804b are respectively arranged in the two corresponding tracks 10b of the flash cartridge 10 so as to slide the guide studs 804b within the tracks 10b. The third torsion spring 90 has two legs 90a and 90b respectively arranged in the recess 802d of the first linkage lever 802 and the recess 804d of the second linkage lever 804, so as to provide two elastic biasing forces or torsions for respectively counterclockwise rotating the first linkage lever 802 and clockwise rotating the second linkage lever 804 in the x-y plane. The force or torsion exerted to the first linkage lever 802 drives the first linkage lever 802 in the x-direction along the tracks 20b of the housing 20, and the force or torsion exerted to the second linkage lever 804 drives the second linkage lever 804 in the x-direction along the tracks 10b of the flash cartridge 10, so as to raise the flash cartridge 10.

A user may provide a force greater than the torsions of the third spring 90 to press the flash cartridge 10 down, in the process moving the first linkage lever 802 in a negative x-direction along the tracks 20b of the housing 20, and moving the second linkage lever 804 in a negative x-direction along the tracks 10b of the flash cartridge 10, so as to force the flash cartridge 10 into a retracted position within the accommodation space 20a.

Figure 5:
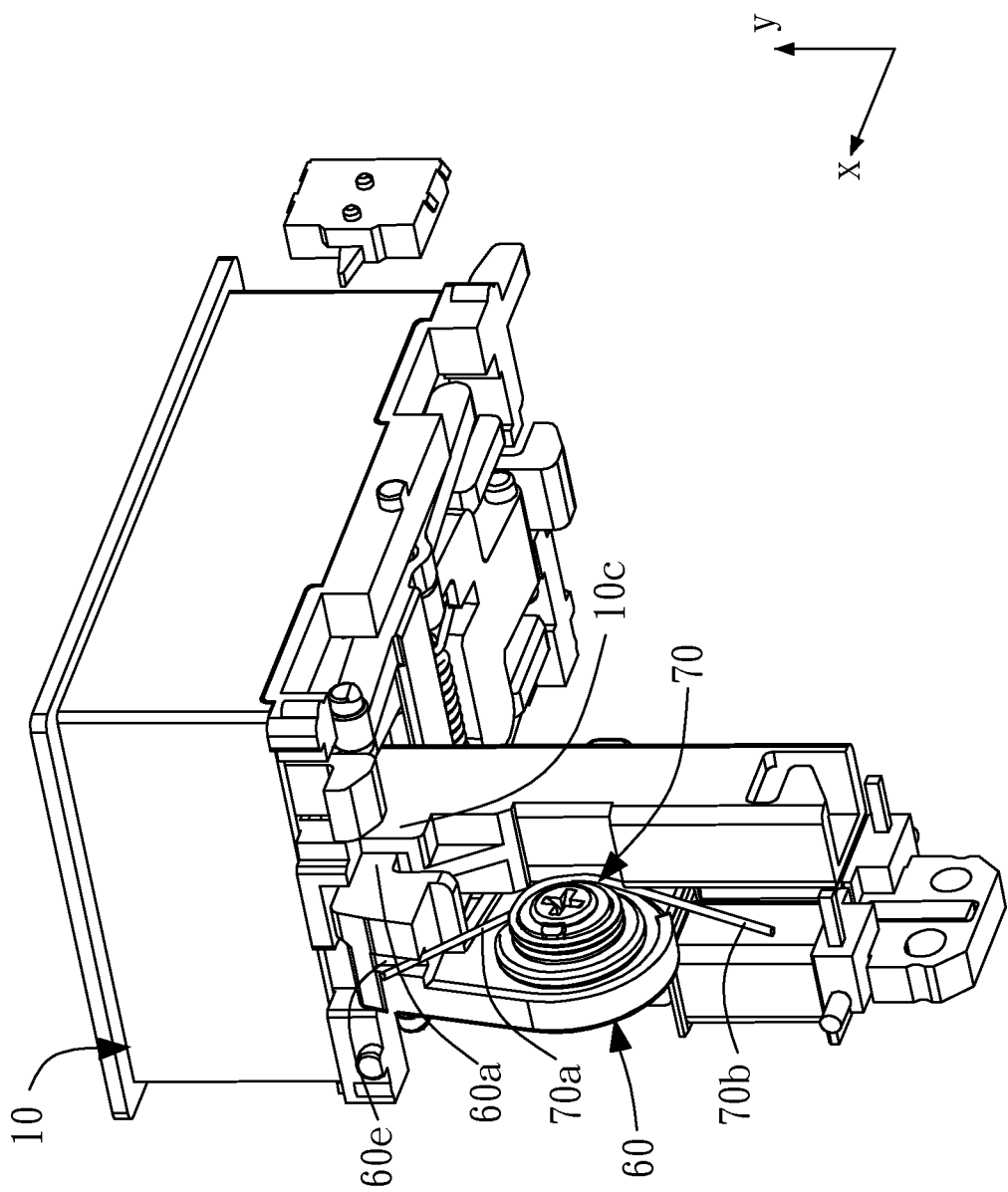
FIG. 5 and FIG. 6 are perspective views of the closed flash module 1 at specific view angles according to the preferred embodiment of this invention.
Figure 6:
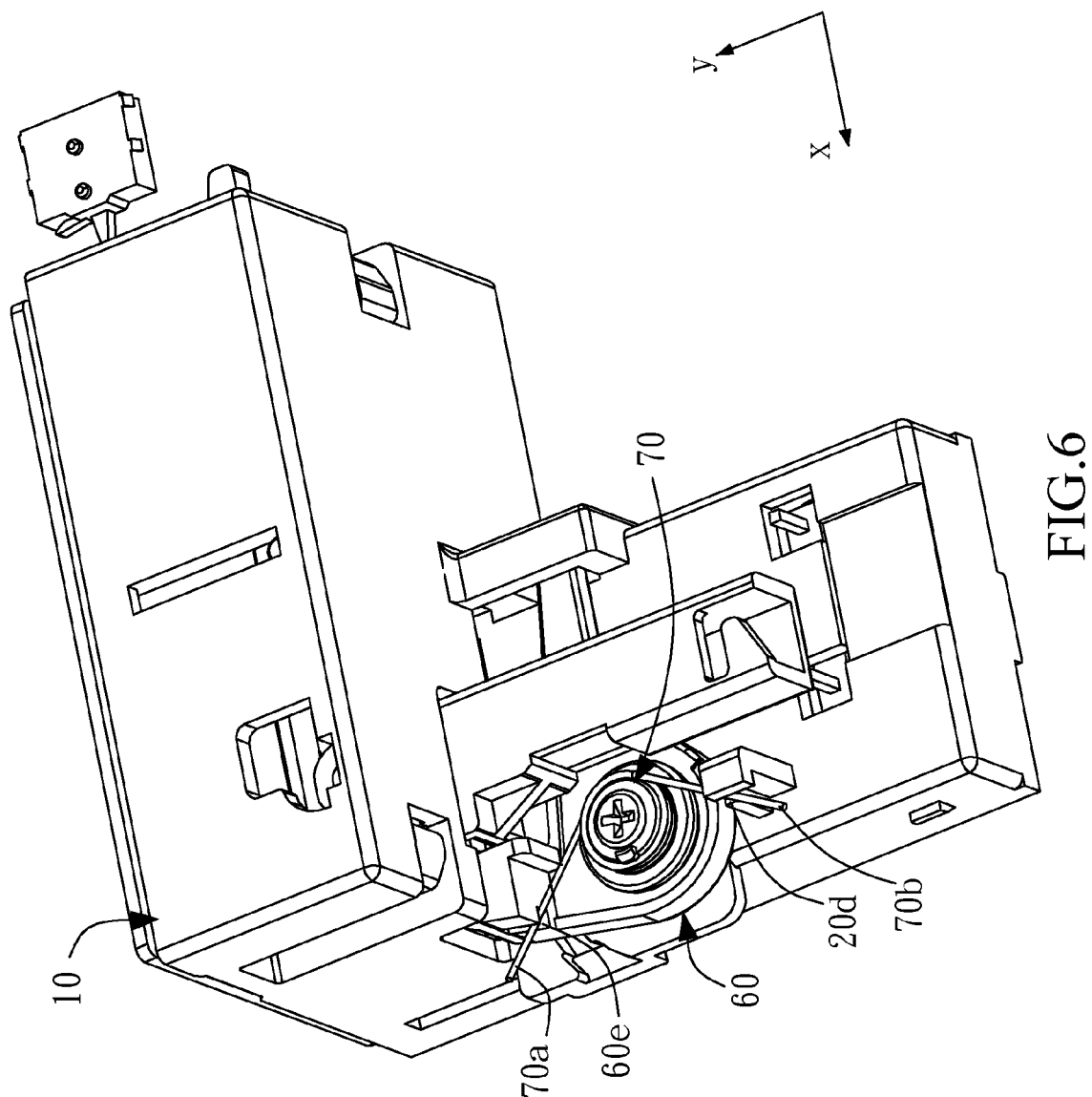

The latching mechanism 60 and the second torsion spring 70 are employed to control the opening of the flash cartridge 10. FIG. 5 and FIG. 6 are perspective views of the closed (fully retracted) flash module 1 at specific view angles, and FIG. 5 omits the housing 20 for clarity.

Referring to FIG. 2, FIG. 5, and FIG. 6, the latching mechanism 60 comprises a latch or hook 60a, a second hinge 60b, a hole 60c, a arm 60d, and a recess 60e. The second hinge 60b passes through the hole 60c so as to rotate the latching mechanism 60 in the x-y plane. In addition, when the latch or hook 60a engages with the retention notch 10c (FIGS. 5, 11A-11B) of the flash cartridge 10, the flash cartridge 10 is retracted in the closed position; when the latch or hook 60a disengages from the retention notch 10b, the third torsion spring 90 exerts the force to the scissor lift assembly 80 to project the flash cartridge 10 to the extended position.

In addition, the second hinge 60b passes through the second torsion spring 70, which has two legs 70a/70b respectively leaning against the recess 60e of the latching mechanism 60 and a recess 20d (FIG. 6) of the housing 20, so as to provide an elastic biasing force or torsion capable of counterclockwise rotating the latching mechanism 60 in the x-y plane. If this elastic biasing force or torsion is not suppressed, the latch or hook 60a will engage within the retention notch 10c, and the flash cartridge 10 will remain in the retracted position.

Figure 7:
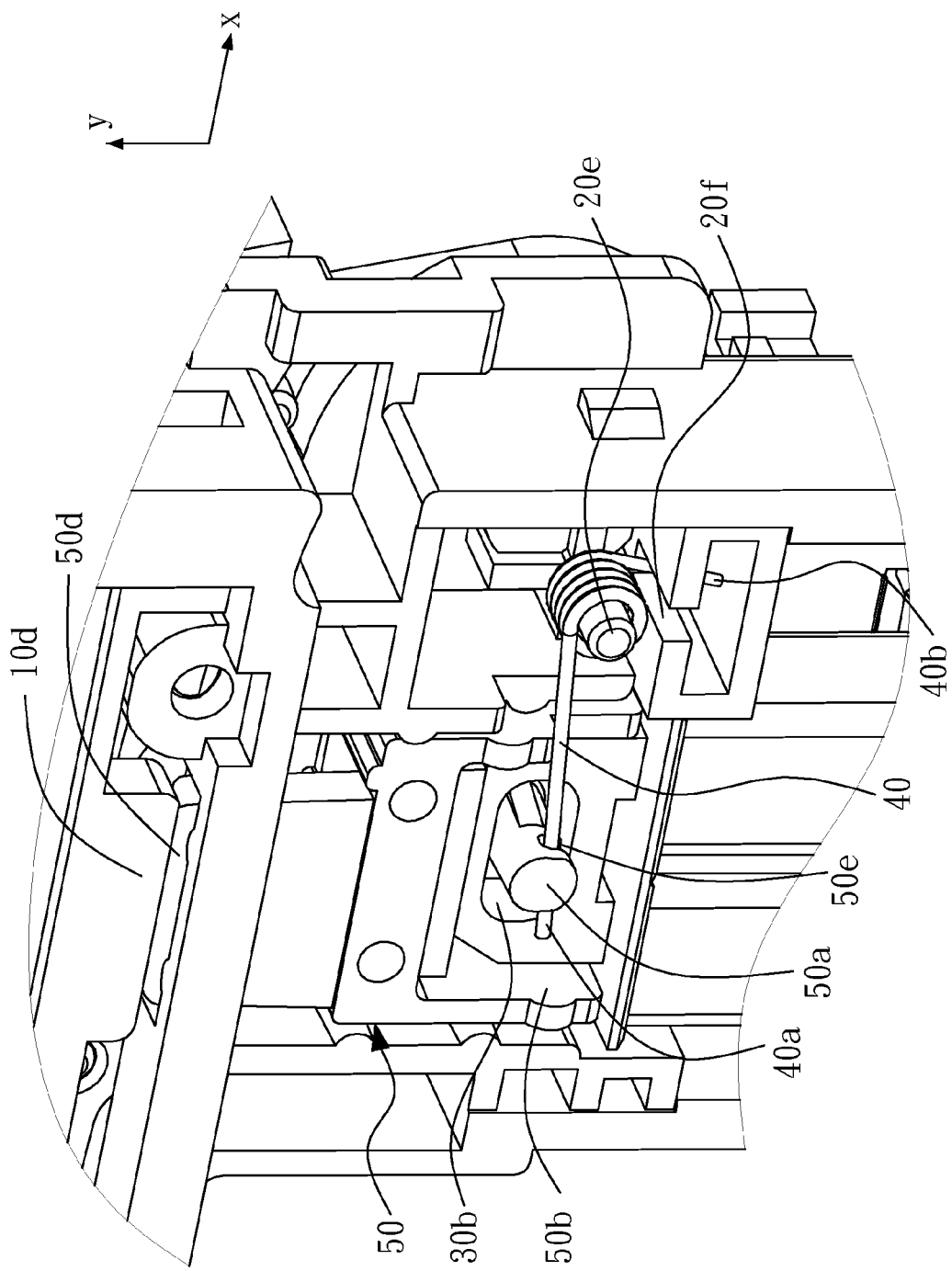
FIG. 7 is a perspective view showing relationship between the first spring 40, the electromagnetic actuator 30, and the mechanical linkage 50 according to the preferred embodiment of this invention.
Figure 8:
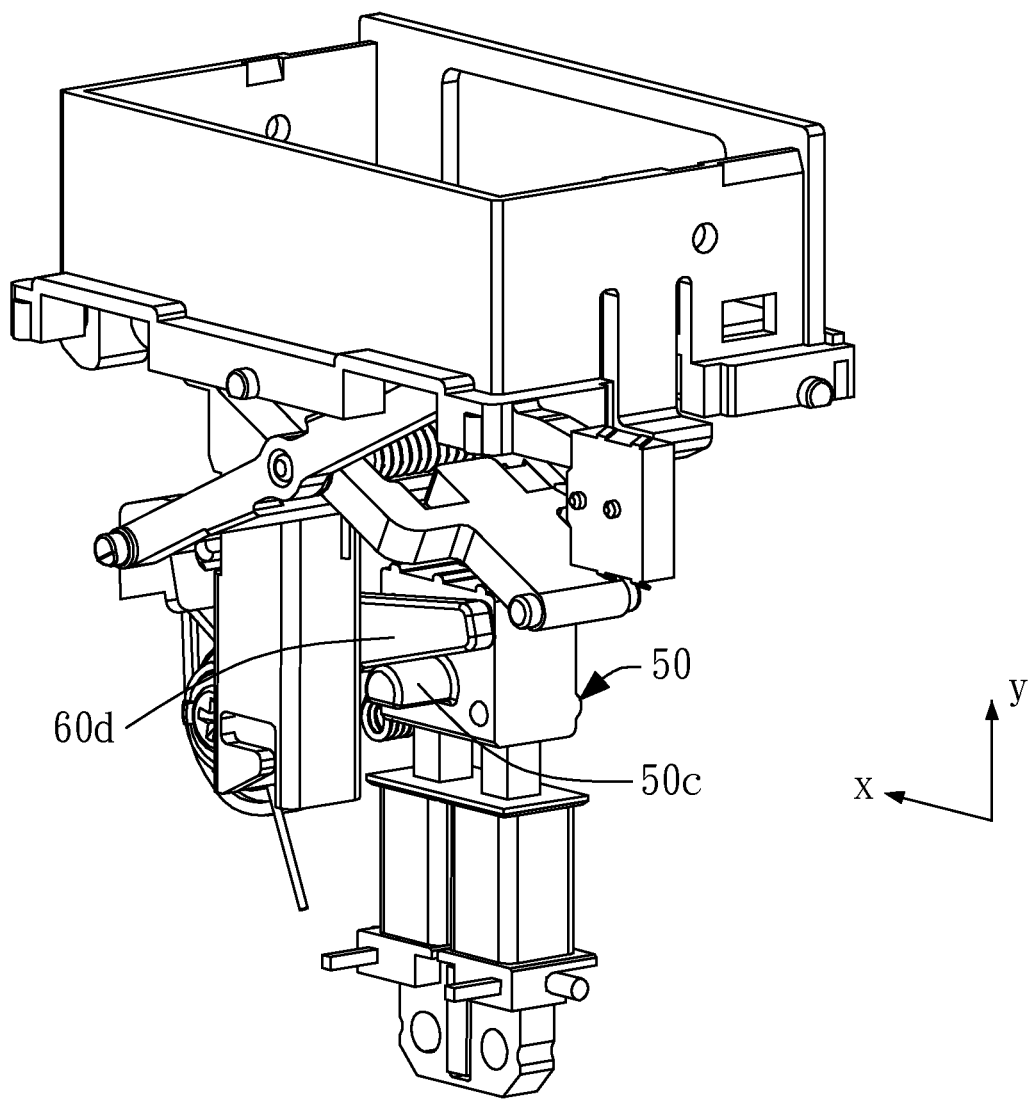
FIG. 8 is a perspective view of the opened flash module 1 at a specific view angle according to the preferred embodiment of this invention.

The electromagnetic actuator 30, the first torsion spring 40, and the mechanical linkage 50 are employed to control the latching mechanism 60. FIG. 7 is a perspective view showing relationship between the first torsion spring 40, the electromagnetic actuator 30, and the mechanical linkage 50. FIG. 8 is a perspective view of the extended flash module 1 at a specific view angle, and the housing 20 is omitted for clarity.

Referring to FIG. 2, FIG. 7, and FIG. 8, the electromagnetic actuator 30 has a moving part 30a capable of moving along the y direction, and the moving part 30a includes an aperture 30b. The mechanical linkage 50 is disposed on the moving part 30a and comprises a shaft 50a, a saddle or nook 50b, a stub 50c, and an upper edge 50d. The shaft 50a passes through the aperture 30b of the moving part 30a, the nook 50b is configured to fit the moving part 30a, the stub 50c of the mechanical linkage 50 is arranged below the arm 60d of the latching mechanism 60, and the upper edge 50d of the mechanical linkage 50 contacts with the thrust abutment 10d of the flash cartridge 10.

In addition, as shown in FIG. 7, the center of the first torsion spring 40 is passed through by a rod 20e of the housing 20, and the first torsion spring 40 has two legs 40a/40b respectively leaning against a groove 50e of the shaft 50a and leaning against a recess 20f of the housing 20, so as to provide an elastic biasing force or torsion capable of moving the shaft 50a toward the y direction.

In this embodiment, the electromagnetic actuator 30 may be a solenoid 30. In detail, the solenoid 30 comprises a permanent magnet (not shown) and a coil (not shown). Because the magnetic force of the permanent magnet is greater than the force that is exerted by the first torsion spring 40 to drive the shaft 50a moving toward y direction, the moving part 30a is moved to negative y direction and attracted by the permanent magnet. When electricity is not supplied, the magnetic force of the permanent magnet attracts the moving part 30a in a retracted position. When electricity is supplied, the coil generates another magnetic force to cancel out the magnetic force of the permanent magnet, so as to free the moving part 30a.

When the magnetic force of the permanent magnet is canceled out, the first torsion spring 40 provides a force or torsion moving the moving part 30a and mechanical linkage 50 toward y direction via the shaft 50. Once the mechanical linkage 50 is moved toward to y direction, the upper edge 50d of the mechanical linkage 50 exerts a force of y direction to push against the thrust abutment 10d of the flash cartridge 10. In the meantime, the stub 50c arranged below the arm 60d of the latching mechanism 60 raises the arm 60d, so that the arm 60d provides a rotating force to clockwise rotate the latching mechanism 60 in the x-y plane by using the second hinge 60b as the center, and this rotating force is greater than the force to counterclockwise rotate the latching mechanism 60 in the xy plane provided by the second torsion spring 70. Therefore, the latching mechanism 60 is clockwise rotated in the x-y plane, the latch or hook 60a disengages from the notch 10c of the flash cartridge 10, and thus the flash cartridge 10 pops up from the accommodation space 20a.

Figure 9A:
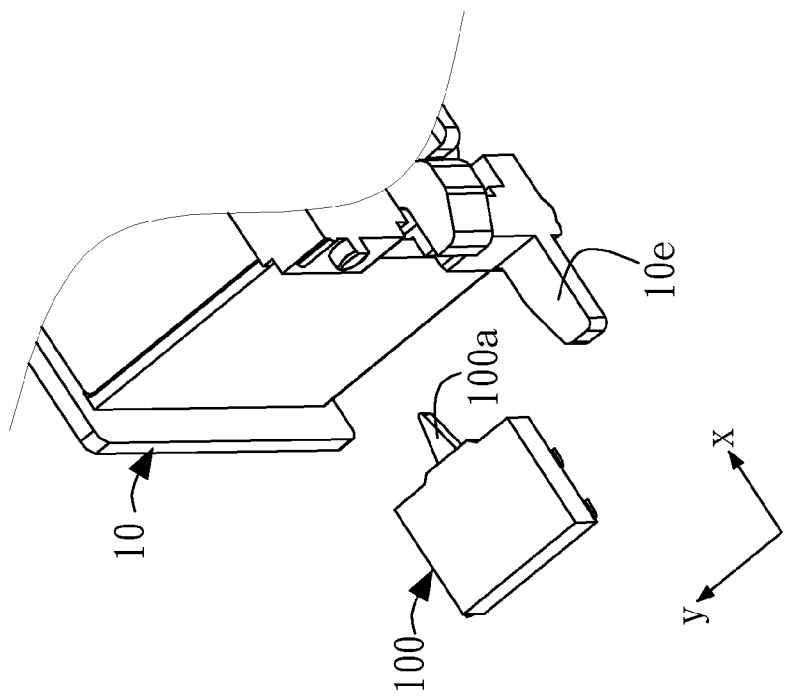
Figure 9B:
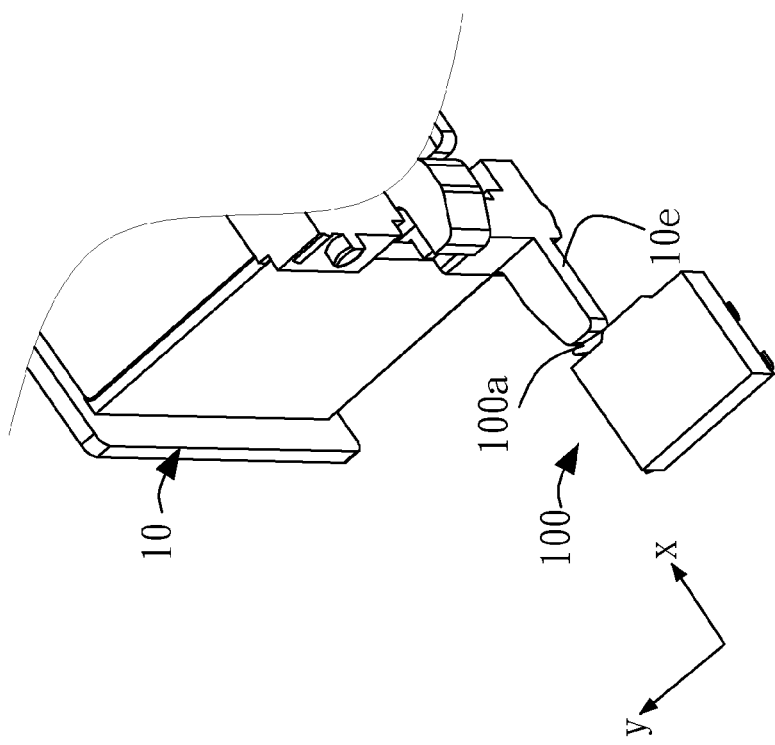

The switch 100 is employed to detect the position of the flash cartridge 10. FIG. 9A and FIG. 9B are partial views of the flash module 1, in which FIG. 9A shows the closed flash cartridge 10, and FIG. 9B shows the opened flash cartridge 10. Referring to FIG. 9A and FIG. 9B, the switch 100 is arranged a side of the flash cartridge 10 for detecting its position. In detail, the switch 100 includes a lever 100a, and the flash cartridge 10 further comprises a control rod 10e that translates as the flash cartridge 10 translates; when the position of the flash cartridge 10 is changed, the control rod 10e will drive the lever 100a, such that the position change of the flash cartridge 10 is detected. Notice that other embodiments of this invention may omit the control rod 10e and switch 80, and employ other components or methods to detect the position of the flash cartridge 10.

Figure 10:
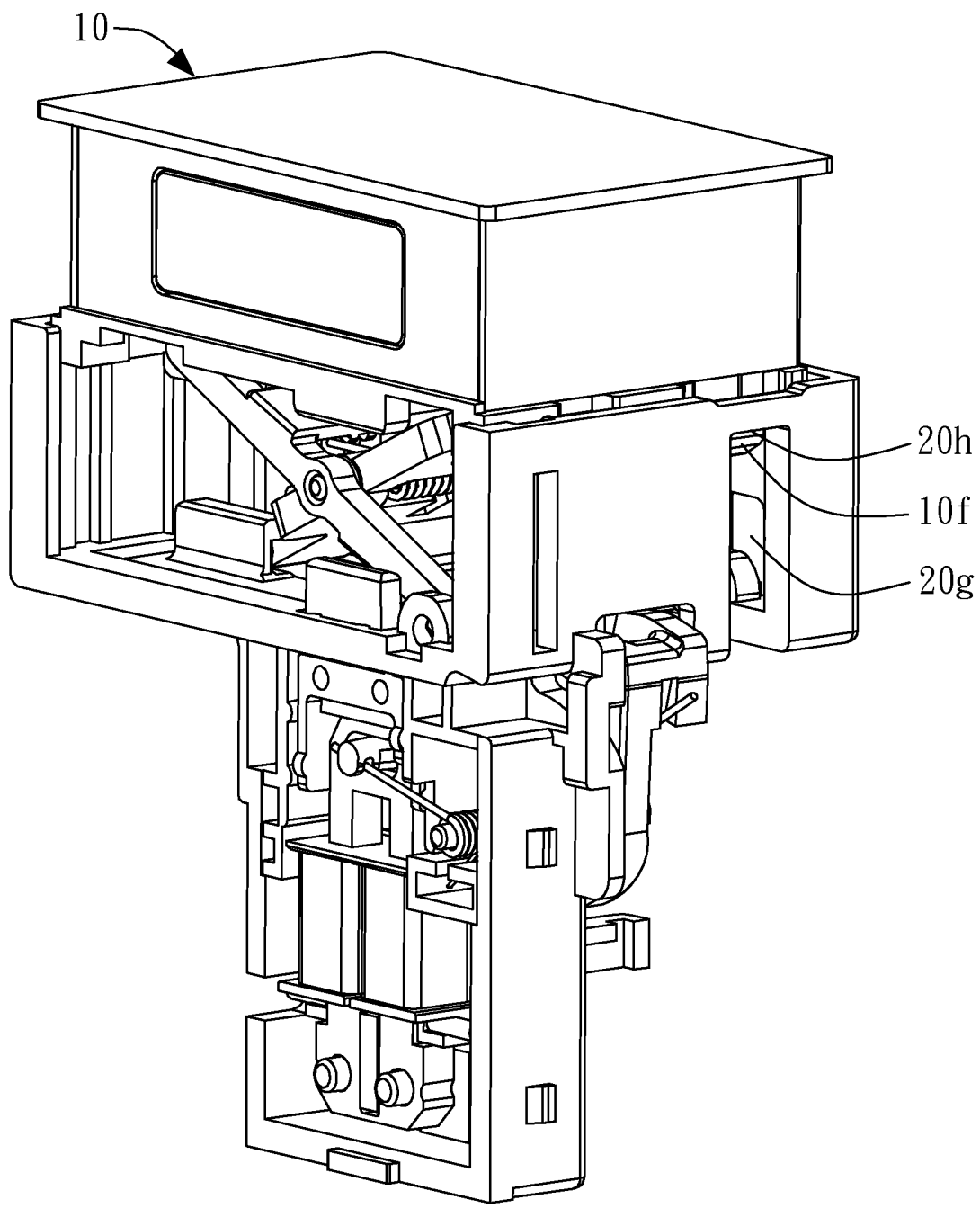
FIG. 10 is a perspective view showing the opened flash module 1 according to the preferred embodiment of this invention.

FIG. 10 is a perspective view showing the opened flash module 1. Referring to FIG. 2 and FIG. 10, the flash cartridge 10 further comprises at least one stop 10f, and the housing 20 comprises at least one track 20g corresponding to the stop 10f. When the flash cartridge 10 is raised from the retracted position to the extended position, the stop 10f is moved along the track 20g as well until it reaches the track end 20h.

Figure 11A:
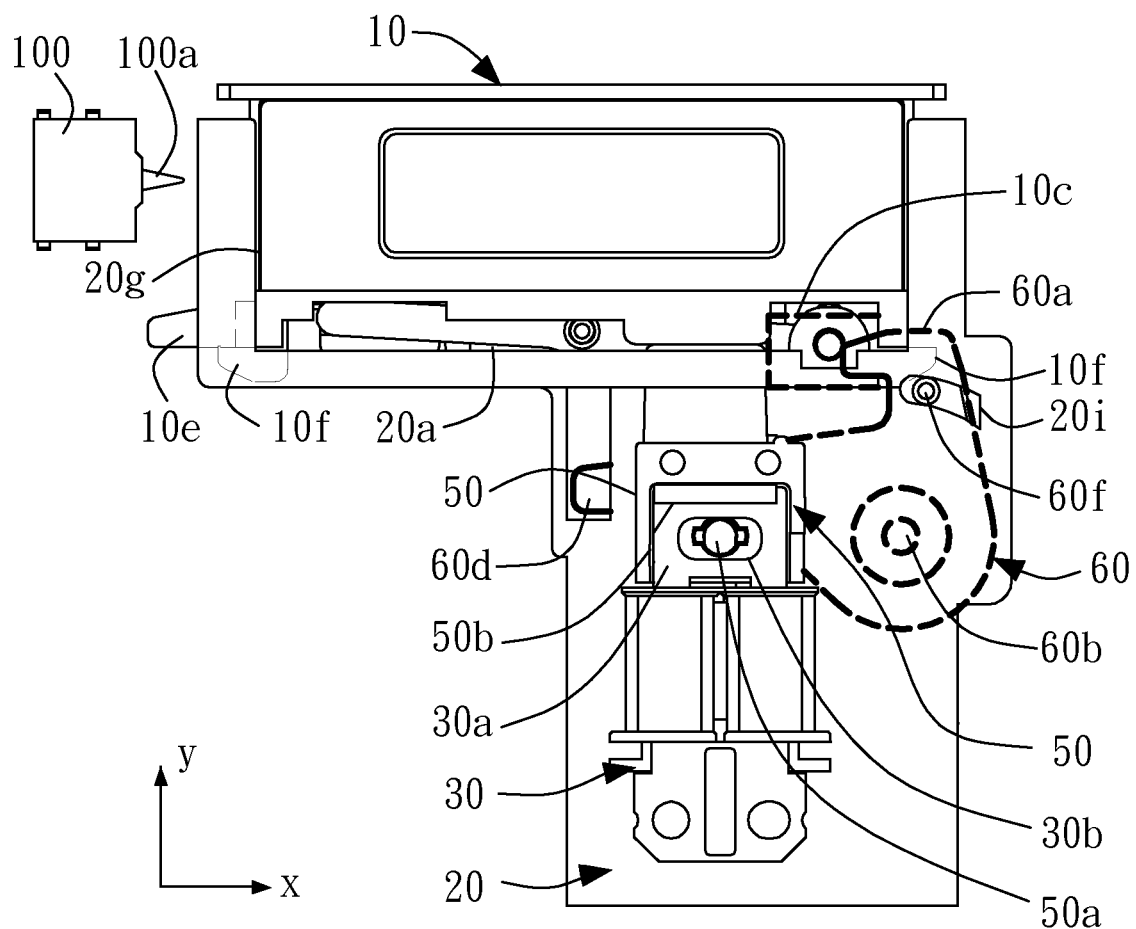
FIG. 11A and FIG. 11B respectively illustrate the closed and opened flash module according to the preferred embodiment of this invention.
Figure 11B:
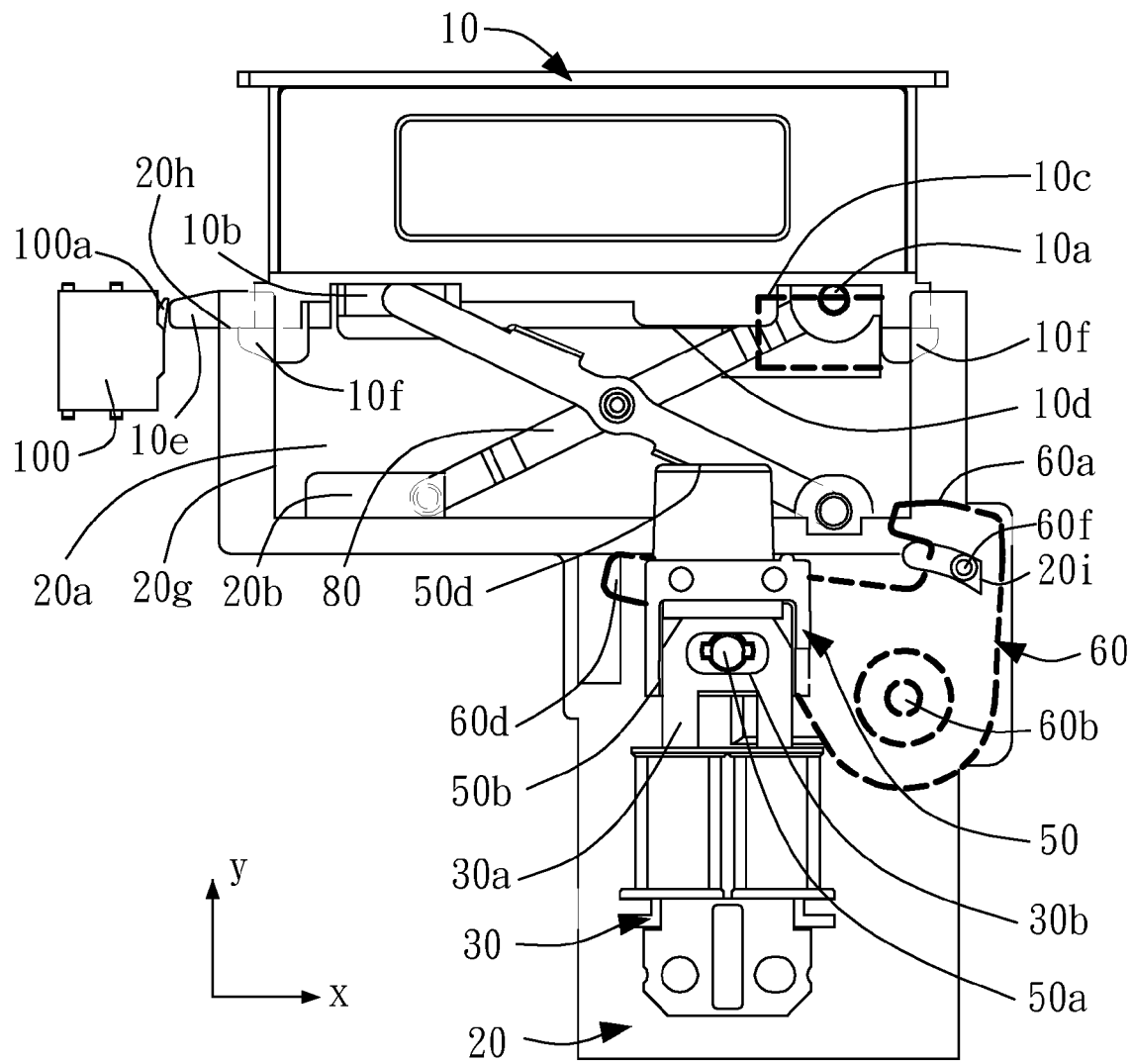

Then the procedures to open and close the flash module 1 are described as follows. FIG. 11A and FIG. 11B respectively illustrate the retracted and extended flash module 1. The first torsion spring 40, the second torsion spring 70, and the third torsion spring 90 are omitted for clarity.

Referring to FIG. 11A and FIG. 11B, when the flash cartridge 10 is retracted, the permanent magnet of the electromagnetic actuator 30 exerts a magnetic force to the moving part 30a, and the magnetic force is greater than the force that drives the shaft 50a in the y direction, so as to retain the moving part 30a in the electromagnetic actuator 30. When the flash module 10 is to be raised from the retracted position to the open position, electricity is supplied to the electromagnetic actuator 30 so as to cancel out the magnetic force exerted to the permanent magnet, such that the first torsion spring 40 drives the moving part 30a and the cooperating mechanical linkage 50 toward the y direction via the shaft 50a. The stub 50c then drives the latching mechanism 60 clockwise rotating in the x-y plane by using the second hinge 60b as the rotating center, such that the latch or hook 60a of the latching mechanism 60 is detached from the notch 10c, thus freeing the flash cartridge 10. In the meantime, the force to suppress the third torsion spring 90 disappears, and thus the scissor lift assembly 80 raises the flash module 10 toward the y direction, until the stop 10f of the flash cartridge 10 reaches the track end 20h, and then the flash cartridge 10 is projected from the accommodation space 20a.

When a user determines to retract the flash cartridge 10, he or she may use the hand to press the flash cartridge 10, and the force to press the flash cartridge 10 is greater than the force to drive the flash cartridge 10 toward the y direction provided by the third spring 90. Also, the thrust abutment 10d of the flash cartridge 10 contacts with the upper edge 50d of the mechanical linkage 50, the mechanical linkage 50 drives the moving part 30a toward the negative y direction, and then the moving part 30a is retracted and again attracted by the magnetic force of the permanent magnet of the electromagnetic actuator 30. In addition, the mechanical linkage 50 drives the stub 50c toward to negative y direction, gradually degrading the force for clockwise rotating the latching mechanism 60, such that the second torsion spring 70 is free to rotate the latching mechanism 60 counterclockwise, about the second hinge 60b, in the x-y plane. The rotation of the latching mechanism 60 causes the latch or hook 60a to engage with the notch 10c so as to retain the flash cartridge 10 in the retracted position.

Notice that the first spring 40, the second spring 70, and the third spring 90 are preferably torsion-coiled springs in this invention. In other embodiments, other elastic members or torsional members known in the art may replace them. Moreover, some minor components are not listed for simplicity. For example, to precisely orient the position, the latching mechanism 60 may further comprise a protrusion 60f (FIG. 2) used for moving along a track 20i (FIGS. 11A, 11B) of the housing 20 when the latching mechanism 60 is rotated.

Figure 12:
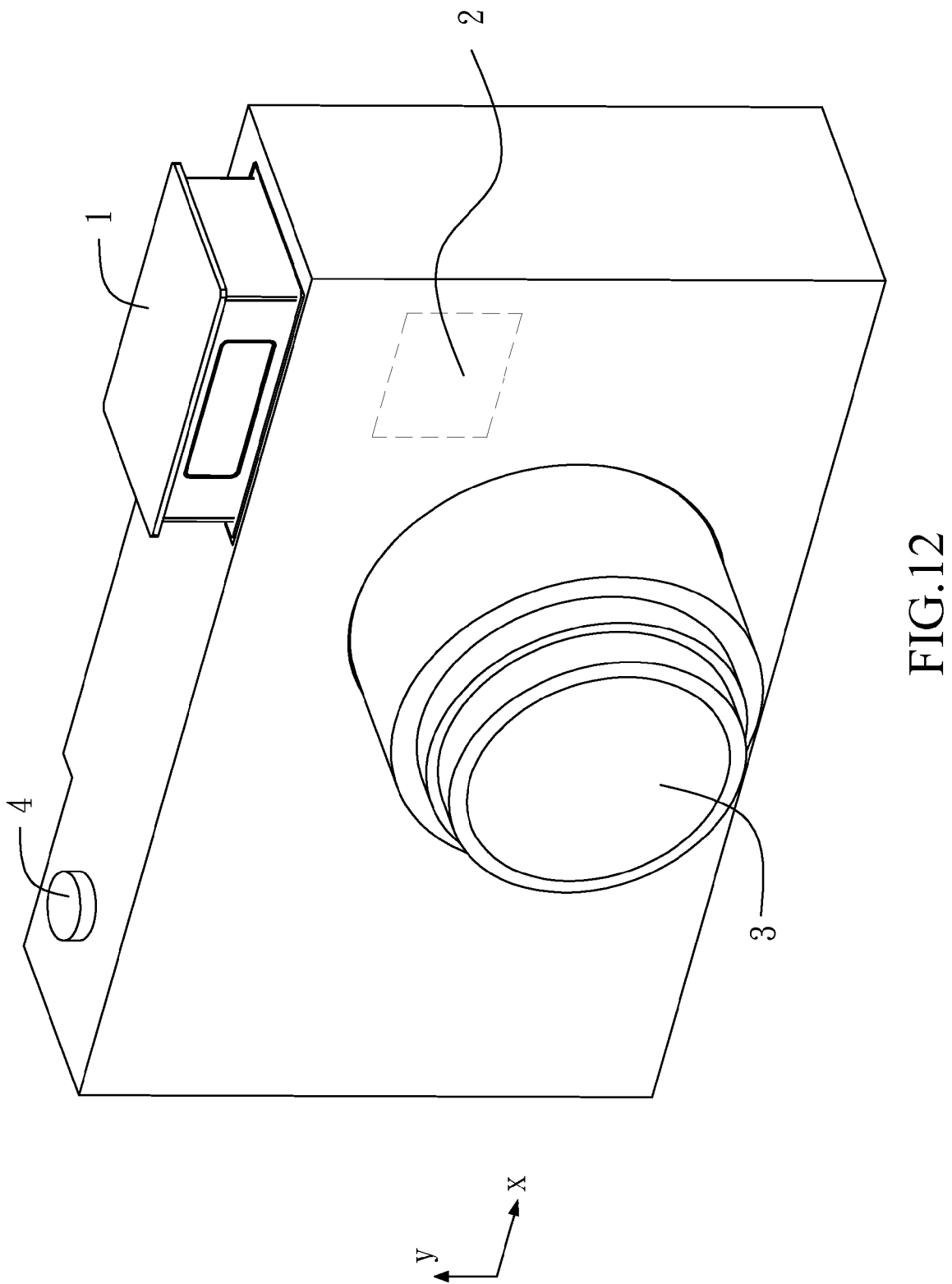
FIG. 12 shows an image-capturing apparatus having the flash module 1, according to another embodiment of this invention.

FIG. 12 shows an image-capturing apparatus having the above-mentioned flash module 1, according to another embodiment of this invention, in which the flash module 1 is extended. The image-capturing apparatus may be, for example, but not limited to, a digital camera or a video camera, and is a digital camera in this embodiment. Besides the flash module 1, the image camera further comprises an image sensor 2, a processor (not shown), a zoom lens 3, and a shutter button 4.

An exemplary operation of the image-capturing apparatus is described as follows. When the user wants to take a picture, he or she semi-presses the shutter button 4 to zoom an object that will be captured and detect the brightness of the environment by the image sensor 2. The detected brightness is transmitted to the processor, which determines whether open the flash module 1 according to the environment brightness. In detail, the criterion is to judge whether the environment brightness is greater than a predetermined value; if yes, the processor issues a flash order to instruct the elements of the flash module 1 performing the foregoing process to pop up the flash cartridge 10. After the flash cartridge 10 is popped to the open position, the switch 100 feeds back a confirmed message to the processor, which issues a charge order after receiving the confirmed message. After the charge is finished, the user completely presses the shutter button 4 to actuate the flash cartridge 10 flashing, and the image sensor 2 captures the image of the object. After the image is captured, the user presses the flash cartridge 10 downward to retract the flash cartridge 10 in the closed position via the foregoing process. Notice that the above-mentioned image sensor 2 is a light-to-electrical conversion unit, which converts a light analog signal to an electric digital signal. The image sensor 2 comprises, for example but not limited to, a charge-coupled device (CCD) or a Complementary Metal-Oxide-Semiconductor (CMOS).

The built-in type flash modules of embodiments of this invention employs a few elements to open and close the flash; this is beneficial to reduce the size of the image-capturing apparatus.

It should be understood that although the background and detailed description have described the invention in the context of light flash modules, the mechanisms set forth herein are equally applicable to other retractable and extendable emitting devices.

Although specific embodiments have been illustrated and described, it will be appreciated by those skilled in the art that various modifications may be made without departing from the scope of the present invention, which is intended to be limited solely by the appended claims.

What is claimed is:

1. An emitter module, comprising:
   a cartridge;
   a linkage lever set comprising a first linkage lever, a second linkage lever and a fulcrum, and the fulcrum passes through the first linkage lever and the second linkage lever;
   a housing providing an accommodation space for retracting the cartridge into a closed position;
   an actuator for triggering movement of the cartridge into the open position, the actuator comprising a moving part;
   a retractable latch for retaining the cartridge in the closed position;
   a mechanical linkage mounted on the moving part of the actuator, the linkage being biased into a cartridge-releasing position that urges the retractable latch into a non-cartridge-retaining position; and
   wherein when the cartridge is in the closed position, the cartridge is retracted in the accommodation space, and the driver attracts the moving part, and the mechanical linkage mounted thereon, into a position accommodating retraction of the cartridge into the accommodation space.

2. The emitter module as recited in claim 1, wherein actuator is operable to release the moving part so that the biased mechanical linkage that is mounted to the moving part drives an arm of the retractable latch to retract the latch from a cartridge-retaining position into a cartridge-releasing position.

3. The emitter module as recited in claim 2, further comprising a first elastic member arranged between the housing and the mechanical linkage, the first elastic member providing a force to bias the mechanical linkage into the cartridge-releasing position.

4. The emitter module as recited in claim 2, further comprising a second elastic member arranged between the housing and the latch, the second elastic member providing a force for moving the latch between cartridge-retaining and cartridge-releasing positions.

5. The emitter module as recited in claim 2, further comprising a third elastic member, wherein when the latch is moved into a cartridge-releasing position, the third elastic member provides a force to the linkage lever set to extend the cartridge to the open position.

6. The emitter module as recited in claim 5, wherein when a second force opposite to and greater than a cartridge extending force is exerted to the cartridge, the cartridge is in contact with the mechanical linkage, and then the mechanical linkage drives the moving part into a first position, relative to the actuator of which it is a part, that operates to retain the moving part into the first position.

7. The emitter module as recited in claim 5, wherein the third elastic member comprises a linkage-lever-biasing spring, and the fulcrum further passes through the linkage-lever-biasing spring.

8. The emitter module as recited in claim 7, wherein the first linkage lever comprises at least a guide stud, the housing further comprises a track for linearly guiding the stud, and the guide stud is arranged in the track, such that the linkage-lever-biasing spring drives the guide stud sliding within the track.

9. The emitter module as recited in claim 7, wherein the linkage lever set is arranged between the cartridge and the housing, the first linkage lever comprises at least one first pivot post connected with at least one first pivot receptacle of the cartridge, and the second linkage lever comprises at least one second pivot post connected with at least one second pivot receptacle of the housing.

10. The emitter module as recited in claim 1, wherein the module further comprises a switch with a lever, and the cartridge further comprises a control rod, and when the cartridge changes its position between the open position and the closed position, the control rod drives the lever.

11. The emitter module as recited in claim 1, wherein the housing further comprises a stop track with a track end, and the cartridge further comprises a stop capable of moving along the track, and when the stop reaches the track end, the cartridge is in the open position and prevented from further extension.

12. The emitter module as recited in claim 1, wherein the driver is an electromagnetic actuator.

13. An emitter module, comprising:
   a cartridge comprising a notch and a thrust abutment;
   a scissor lift assembly used to move the cartridge to an open position or a closed position;
   a housing comprising an accommodation space;
   an actuator comprising a moving part with an aperture;
   a mechanical linkage comprising a shaft, a stub, an upper edge, and a nook; and
   a latching mechanism comprising a hook, a arm, and a hinge;
   wherein when the cartridge is in the closed position, the cartridge is retracted in the accommodation space and the actuator attracts the moving part in a first position;
   wherein the nook is configured to fit the moving part, the shaft passes through the aperture, and the upper edge contacts with the thrust abutment of the cartridge at the closed position; and wherein the latching mechanism is inserted into the notch at the closed position, the arm is arranged above the stub of the mechanical linkage, and the hinge is capable of rotating the latching mechanism.

14. An electronic apparatus, comprising:
a sensor for detecting an environment brightness;
a processor for issuing a flash order according to the environment brightness; and
a flash module, comprising:
    a flash cartridge;
    a housing comprising an accommodation space for retracting the flash cartridge in a closed position;
    a linkage lever set arranged between the flash cartridge and the housing, comprising a first linkage lever, a second linkage lever and a fulcrum, and the fulcrum passes through the second linkage lever and the first linkage lever;
    an actuator comprising a moving part, the actuator being operable to attract the moving part into a first position;
    a mechanical linkage mounted on the moving part of the actuator, the linkage being biased into a cartridge-releasing position that urges the retractable latch into a non-cartridge retaining position;
    a retractable latch for retaining the cartridge in the closed position;
    a first elastic member arranged between the housing and the mechanical linkage; and
    a second elastic member arranged between the housing and the latching mechanism.

15. The electronic apparatus as recited in claim 14, when the processor performs a zooming process, the processor determines whether to open the flash module according to the environment brightness, and if the flash module is determined to open, the flash is moved to the open position.

16. The electronic apparatus as recited in claim 14, further comprising a third elastic member, wherein when the actuator frees the moving part, the first elastic member drives the moving part moving to a second position engaging the latch into a cartridge-releasing position.

17. The electronic apparatus as recited in claim 16, wherein when a second force opposite to and greater than a cartridge-extending force is exerted to the flash cartridge, the flash cartridge is in contact with the mechanical linkage, and then the mechanical linkage drives the moving part moving to the first position, relative to the actuator of which it is a part, that operates to retain the moving part into the first position.

18. The electronic apparatus as recited in claim 14, wherein the flash module further comprises a switch with a lever, and the flash cartridge further comprises a control rod, and when the cartridge changes its position to between an open and closed position, the control rod drives the lever such that the switch feeds back a cartridge-position-indicating signal to the processor.

19. The electronic apparatus as recited in claim 14, wherein the first linkage lever and the second linkage lever respectively comprise at least one guide stub, the housing and the flash cartridge respectively comprise at least one track, and the guide stubs are arranged in the tracks, such that a biasing spring drives the guide stubs within the tracks, and wherein the fulcrum passes through a hole of the second linkage lever, the biasing spring, and a hole of the first linkage lever, the first linkage lever further comprises at least one first pivot post connected with at least one first pivot receptacle of the flash cartridge, and the second linkage lever comprises at least one second pivot post connected with at least one second pivot receptacle of the housing.

20. The electronic apparatus as recited in claim 14, wherein the housing further comprises a track with a track end, and the flash cartridge further comprises a stop capable of moving along the track, when the stop reaches the track end, the flash cartridge is in the open position and prevented from further extension.

* * * * *